United States Patent [19]

Sanctuary

[11] 3,718,772

[45] Feb. 27, 1973

[54] DYNAMIC EGG PRESENTATION

[75] Inventor: Clifford Sanctuary, Palos Verdes Estates, Calif.

[73] Assignee: Del Mar Engineering Laboratories, Los Angeles, Calif.

[22] Filed: Dec. 9, 1971

[21] Appl. No.: 206,485

[52] U.S. Cl. ........................179/100.2 B, 128/2.06 A

[51] Int. Cl.......G11b 27/00, G11b 31/00, A61b 5/04

[58] Field of Search....................128/2.06 A, 2.06 G; 179/100.2 B

[56] References Cited

UNITED STATES PATENTS 3,229,687 1/1966 Holter et al......................128/2.06 A 3,215,136 11/1965 Holter et al......................128/2.06 A

*Primary Examiner*—Vincent P. Canney

*Assistant Examiner*—Robert S. Tupper

*Attorney*—Geo. Fred Smyth et al.

[57] ABSTRACT

A reproducing system for use as a high speed magnetic tape scanning instrument to provide for the superimposing of recurring signals such as ECG complexes on a visual indicator such as an oscilloscope from signals previously recorded for long time periods by a very slow single-track magnetic tape recorder. Trigger signals are developed from the reproduction by a first playback head of the ECG signals recorded on the tape. The trigger signals are delayed a particular period to provide for control signals to control the activation of the oscilloscope sweep at the proper times to produce a stable superimposition of the ECG signals as reproduced by a second playback head spaced from the first playback head. The particular period of delay is provided electronically or electromechanically.

10 Claims, 4 Drawing Figures

DYNAMIC ECG PRESENTATION

The present invention relates to the playback and display of electrocardiographic data and more particularly to an electrocardiographic system for providing a high speed display of superimposed ECG signals which have been recorded at a very slow speed by a single track magnetic tape recorder.

There are many devices available which provide a visual presentation of ECG signals for viewing by a cardiologist or other qualified personnel. Examples of such devices are monitor systems including a cathode ray oscilloscope wherein the ECG signals are immediately but momentarily presented for observation and electrocardiograph systems wherein the ECG signals are recorded on a paper tape in the form of a graph or electrocardiogram which may subsequently be viewed for a determination of the ECG characteristics.

Another device which is more desirable than the above described systems is an Electrocardioscanner which provides for a fast time playback and presentation of ECG signals on a cathode ray oscilloscope with each signal superimposed on its predecessor signal. The ECG signals were previously recorded for long periods at very slow speed on magnetic tape. The Electrocardioscanner may also provide a real time reproduction of selected portions of the ECG record from the ECG signal information which was previously recorded on the magnetic tape. An example of this type of Electrocardioscanner is fully disclosed in U.S. Pat. No. 3,215,136 issued Nov. 2, 1965.

In the fast-time playback of the ECG information using the superimposition of successive ECG complexes, the ECG complexes that are duplicates of each other appear as a single, relatively steady, electrocardiographic wave shape. Conversely, when one electrocardiographic complex differs significantly from the others, it is apparent immediately as a superimposed aberrant wave shape. Progressive deviations of the wave shape are immediately evident due to the dynamic nature of the presentation.

The presentation of the ECG signals by the superimposition of successive ECG complexes necessitates initiation of the display of each of the individual complexes at the same point of time in each ECG complex. If this is not accomplished, the complexes will not be exactly superimposed and the ECG signals would appear to randomly move along the horizontal axis of the display tube of the oscilloscope. In the prior art electrocardioscanning device of U.S. Pat. No. 3,215,136, the superimposition of the ECG signals at the proper time is accomplished by recording the same ECG signals on two different tracks of a magnetic recording tape but with the signals on the different tracks longitudinally displaced and by using two spaced magnetic playback heads for reproducing the ECG signals. The first of these playback heads reproduces the ECG signals on the first tape track for the purpose of producing a trigger signal while the second playback head reproduces the ECG signals on the second tape track for the purpose of displaying the ECG signal. The two playback heads are spaced such that the trigger signal provided from the first track will synchronize the horizontal sweep of the oscilliscope with the ECG signal provided from the second track so each ECG trace on the oscilliscope is initiated at the same point in the ECG complex and is displayed in its entirety.

The primary disadvantage of the above described two track system for the superimposition of ECG signals is the requirement for dual track recording of the ECG signals. Since the correct longitudinal displacement between the ECG signals on one track used to provide the trigger signals and the ECG signals on the other track used to provide the display signals is a determining factor in the proper superimposition of the ECG traces, the physical displacement between the recording heads as well as the duplication of this exact physical relationship in the playback heads is extremely critical. The adjustments to establish the required relationship between the two record heads and the two playback heads is a costly production process. In addition because specialized test equipment and techniques are involved in these precision adjustments of the record and playback heads, these adjustments must be accomplished by skilled personnel. In addition to the above disadvantages of the two track system, the width of tape needed for recording on two tracks is obviously greater than if a single-track system could be substituted.

The present invention provides a system for the recording and playback of the ECG signals on a single track on a magnetic tape and with the superimposition of the ECG signals on a visual display. Both the trigger signals and the display signals are reproduced from the single record track to overcome the requirement of two precisely displaced tracks of information. The present invention includes a trigger time delay so as to provide for the production of the trigger signal to control the superimposition of the ECG signals.

The present invention uses two displaced playback heads and with both playback heads reproducing the information recorded on the single track and with the more advanced playback head used to reproduce the information for providing the trigger signals and with the second playback head used to reproduce the information for providing the display signals. The trigger signal is produced in response to the increased amplitude of the R portion of the ECG signal. The various portions of the ECG signal are commonly referred to as the PQRST complex of which the R portion occurs part way through the complex. The physical size of the heads prohibit the positioning of the heads close enough so as to produce the trigger signal directly from the magnetic tape. The heads cannot be positioned close enough due to the close spacing of each ECG complex on the magnetic tape record. The close spacing of each ECG complex is obtained from recording the ECG information at very slow speed while the recorder is being worn by the subject under electrocardiographic surveillance. For example, a complete ECG complex can be as close as 0.03 inch to another if the recorded heart rate is as high as 250 beats per minute. The playback head used to provide the trigger signal has to be appreciably advanced in position with a concurrent advance in time over the playback head used to provide the display signal and the trigger signal then has to be delayed. The present invention includes the use of two different methods, one electronic and one electromechanical, for obtaining the desired delay. The desired delay is a function of the spacing between the two playback heads, the time interval between the initial point of the ECG complex and the trigger signal produced from the R portion of the ECG complex and the speed of the magnetic tape. This delay has to remain constant, irrespective of the rate of the ECG signals which has been recorded on the tape.

The desired delay may be achieved electronically by feeding the signals reproduced by the playback head used for providing the trigger signals into a suitable amplifier - filter to provide the trigger signals and with the trigger signals then applied to an appropriate number of series monostable multivibrators each with a predetermined time delay. The number of such multivibrators and the time delay of each one is dictated by the desired delay and the time duration of the ECG complex. The output of the series multivibrators is a pulse signal having pulses with a desired time delay relative to the pulses introduced to the series multivibrators. These output pulses are used to control the initiation of the horizontal sweep of the sweep generator of the cathode ray oscilloscope at a time ahead of the R portion of the same ECG complex from which the trigger signal was developed and with the ECG signals fed into the oscilloscope from the playback head providing the display signal to thereby achieve a display on the oscilloscope of superimposed ECG signals.

The electro-mechanical method of providing the desired delay performs the same function as the electronic circuit described above and has the added advantage of providing a fixed delay irrespective of the speed of playback, thereby allowing for different high speed ratios between record and playback. The electromechanical system uses the trigger signal developed from the information reproduced by the first playback head and re-records this trigger signal on either a small tape loop or a small disc. The tape loop or disc may be driven by the same drive as is used for the main tape drive. A third playback head reproduces the data from the tape loop or disc at a fixed distance from the point at which the data was recorded and with this distance slightly less than the distance between the first and second playback heads on the main tape deck. This electromechanical system provides for the trigger signal to control the actuation of the scope sweep slightly ahead of the reception of data signal. An additional erase head is required on the tape loop or disc after the third playback head to erase the data prior to the recording of the new trigger information.

A clearer understanding of the invention will be had by reference to the following description of the drawings, wherein.

Figure 1:
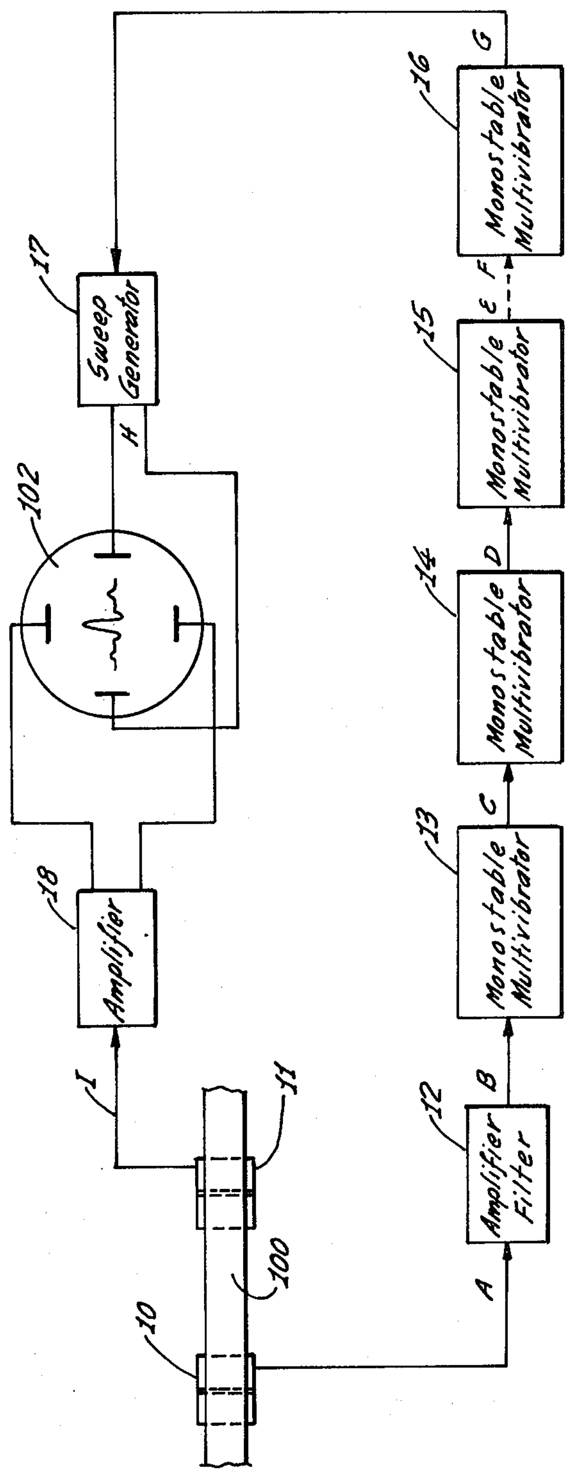
FIG. 1 is a block diagram of a first embodiment of the invention employing an electronic delay means.

Referring first to FIG. 1, there is shown a first playback head 10 for use in providing trigger signals and a second playback head 11 for use in providing display signals. In the present invention, the heads 10 and 11 are conventional playback heads whose outputs are accurate reproductions of ECG signals previously recorded on the magnetic tape 100 and are positioned such that both heads are on the same track with the first playback head 10 being the most advanced relative to the reproduction of the data on the magnetic tape 100.

Figure 2:
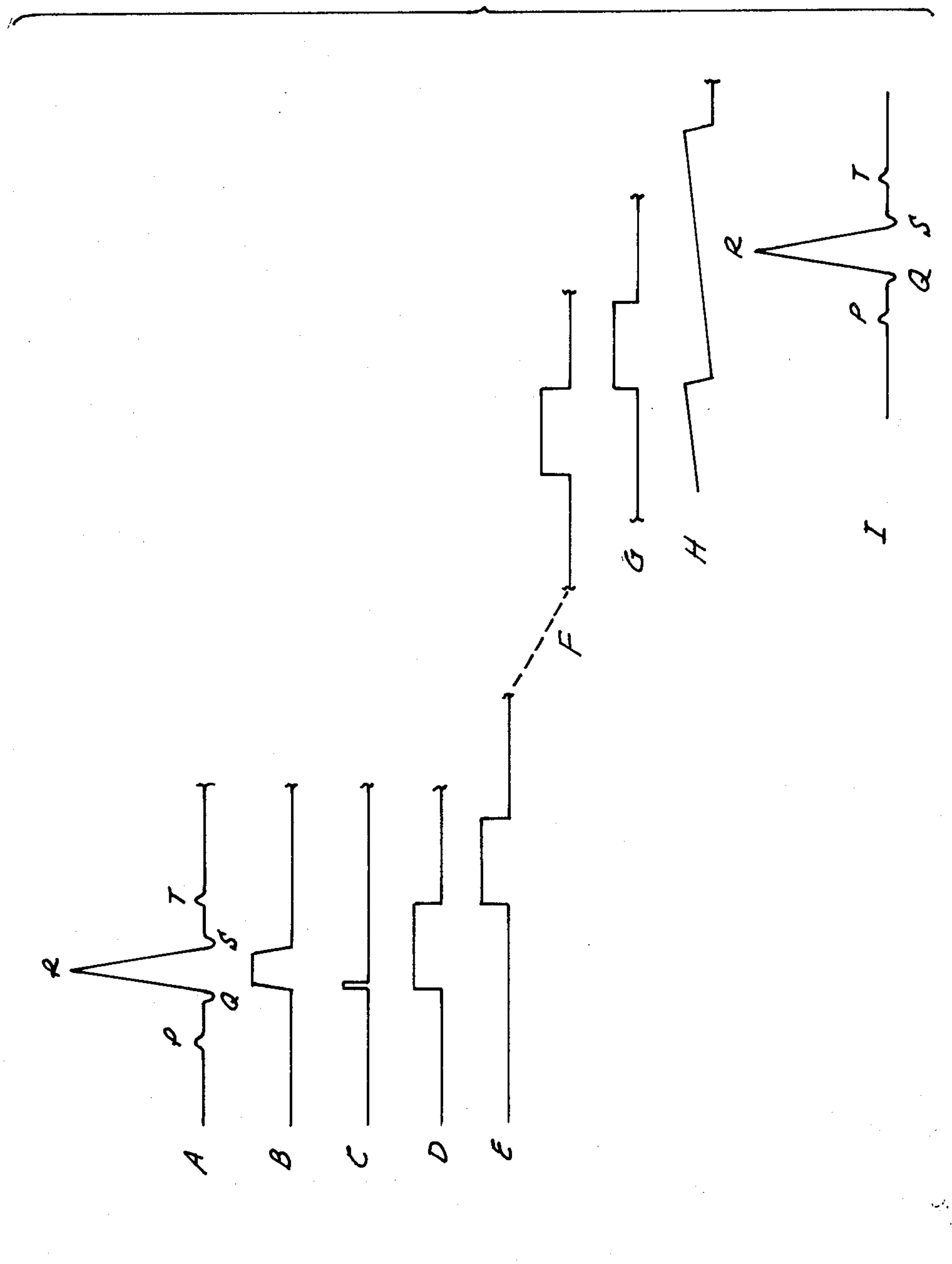
FIG. 2 is a series of wave-forms A through I which represent the signals at various portions of the block diagram of FIG. 1.

As a general rule, in a normal or healthy person the ECG signal will have a waveform similar to the form shown in waveforms A and I of FIG. 2. This normal waveform includes portions in the following sequence; a P wave of positive polarity; a QRS complex consisting of a negative Q wave, a positive R wave and a negative S wave; and finally, a T wave of positive polarity that is separated from the QRS complex by a ST segment. There may be several additional waves present in a normal ECG waveform, but since these additional waves will have little or no effect on the operation of the present invention, the description of the present invention will be confined for purposes of simplicity to waveforms of the above described nature. The R wave, which is the most conspicuous portion of the ECG signal, comprises a positive pulse having an amplitude greater than any other wave present in the ECG signal.

In the portion of the system shown in FIG. 1 which is concerned with the production and delay of the trigger signal, the output of the first playback head 10 is first directed to an amplifier-filter 12. This amplifier-filter 12 which is conventional design is effective to amplify the signal as well as filter out or suppress the P, Q, S, and T waves. Thus the output from the amplifier-filter 12 will be a pulse as shown by waveform B of FIG. 2, which represents the R wave. Accordingly, there will be a pulse from the amplifier-filter 12 each and every time an R wave occurs so that these pulses will form a trigger signal which has the same frequency or rate as the ECG signals reproduced by the first and second playback heads 10 and 11.

The output from the amplifier-filter 12 is coupled to a first monostable multivibrator 13. The multivibrator circuit 13 is responsive to the amplitude of the trigger signal so that the output of the multivibrator 13 will be low when the input is low. However, each time the input to the multivibrator 13 rises above a predetermined level, the multivibrator 13 will change its state so that the output of the multivibrator will be high. The duration of this change in state for the multivibrator 13 is a predetermined time interval determined by the values of the components forming the multivibrator 13. As a consequence, the output from the multivibrator 13 is a series of squarewave pulses such as the pulse shown by the waveform C of FIG. 2 which pulses have a constant amplitude and a constant time duration. The frequency of these pulses C is identical to the frequency of the ECG signal and the duration of the pulses is preferably a small fraction of the period of the R wave.

The output from the multivibrator 13 is coupled to the first in a series of conventional monostable multivibrators with the duration of the output pulse from each multivibrator being of the same predetermined time interval which appreciably exceeds the time interval of pulse C and with the pulse from each succeeding multivibrator initiated by the termination of the pulse from the preceding multivibrator. Referring to FIGS. 1 and 2, the first of these monostable multivibrators 14 generates an output pulse as shown by waveform D of FIG. 2. This pulse D, in turn, is coupled to multivibrator 15 to generate an output pulse shown by waveform E of FIG. 2. The pulse E is processed through the intervening series multivibrators to appear as an input pulse F to multivibrator 16, which multivibrator 16 is the last in the series of time delay monostable multivibrators.

The output of multivibrator 16 is shown by waveform G of FIG. 2 and is coupled to sweep generator 17 which forms an integral part of a conventional cathode ray oscilloscope 102. The oscilloscope 102 is used for visual presentations of the superimposed ECG signals. The resulting sawtooth output of the sweep generator 17 is shown by waveform H of FIG. 2 and each sawtooth output causes an oscilloscope presentation of an entire ECG complex shown by waveform I of FIG. 2. The ECG complex is reproduced by the playback head 11 and is amplified by a conventional amplifier 18. Amplifier 18 is of conventional design to provide a uniform amount of gain with sufficient bandwidth to amplify all of the components in the ECG signal without distortion. The output signal from the amplifier 18 is therefore a faithful reproduction of the ECG signal but of increased amplitude.

The sawtooth output H commences with the input of each pulse G to the sweep generator 17 and each sawtooth continues until the succeeding pulse G terminates the sawtooth and causes a new sawtooth to be generated. As previously described, the desired delay to provide for the control of the sweep is a function of the spacing between the playback heads, the time interval between the start of the ECG complex and the trigger action prompted by the R wave, and the speed at which the magnetic tape is traveling. With the proper delay to the initiation of the individual oscilloscope sweeps, the result is an oscilloscope presentation of ECG complexes superimposed one on the other and with like ECG complexes giving the appearance of a single, stable ECG complex.

In a typical case where the recorded tape speed was 7.5 inches per minute and the fast time playback tape speed is 7.5 inches per second, a spacing between the first playback head 10 and second playback head 11 of 0.75 inches results in the ECG signal arriving at the second playback head 11 100 milliseconds after the ECG signal has arrived at the first playback head 10. With this knowledge and the necessity to trigger the oscilloscope sweep 4 milliseconds ahead of the time when the R wave is received at the second playback head 11 so as to achieve a presentation of the complete ECG complex, the desired delay for the trigger signal is 96 milliseconds. If a heart rate of up to 240 beats per minute is considered to be a maximum and if the playback is at 60 times real time, trigger pulses occur at time intervals as short as 4.2 milliseconds. In order that each of the series monostable multivibrators will generate an output and return to its normal state prior to the succeeding input, the duration of the output pulse from each multivibrator must be held to value less than the time interval between trigger pulses. As a particular example, a multivibrator output pulse duration of 3 milliseconds may be chosen. To provide circuitry capable of delaying the trigger signal the desired 96 milliseconds while accepting inputs at a satisfactory rate, the delay circuit may therefore consist of a series of 32 monostable multivibrators each having a 3-millisecond delay time. This delay produces pulses with the desired delay to trigger the scope sweep irrespective of the rate at which the ECG signal was recorded up to a maximum rate equivalent to a heart rate of 240 beats per minute.

Figure 3:
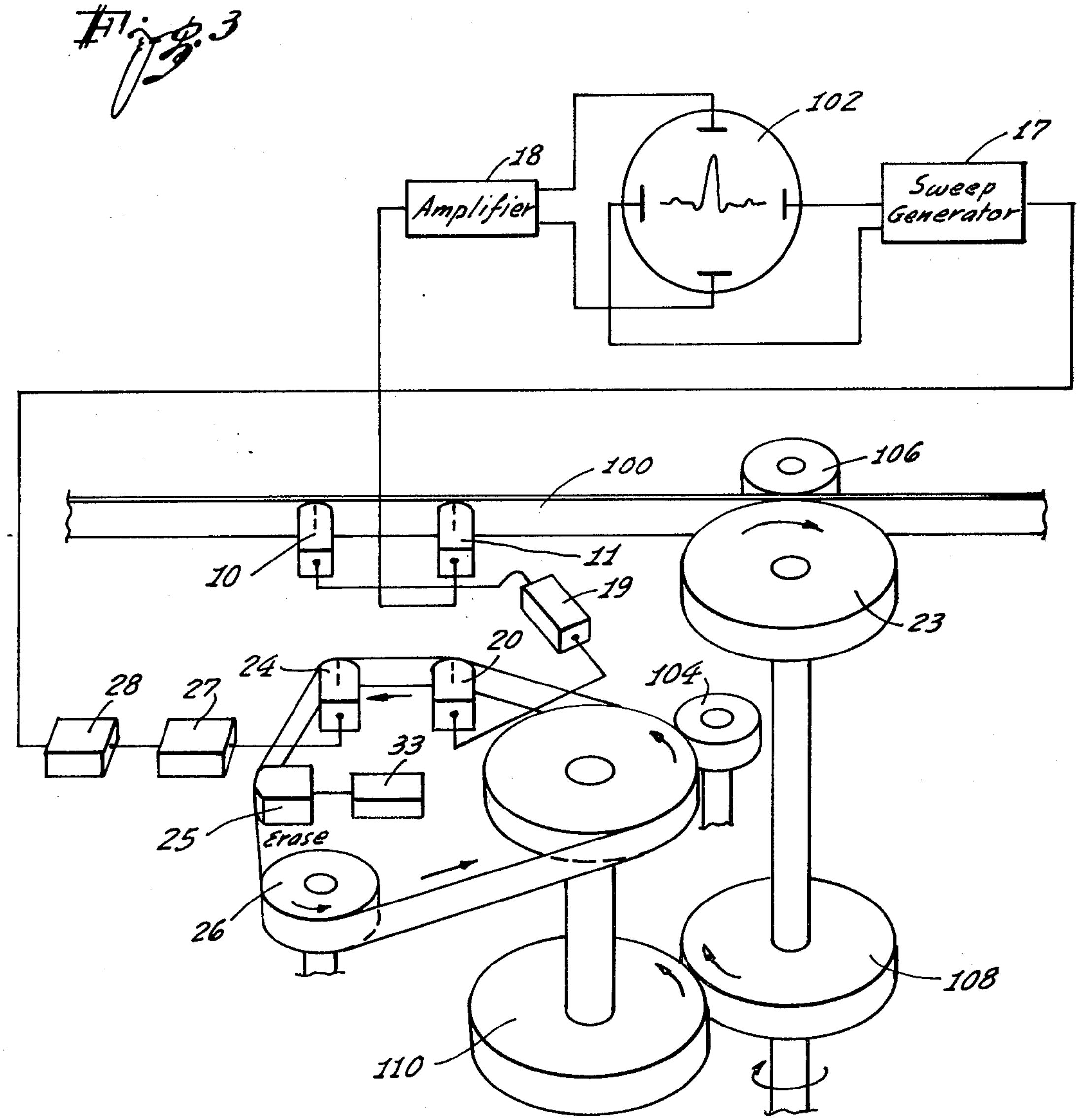
FIG. 3 is a schematic view of a second embodiment of the invention employing a tape loop means to provide the delay.

FIG. 3 illustrates a second embodiment of the invention and includes the first playback head 10, the second playback head 11, and the pre-recorded ECG signals on the magnetic tape 100 in the same manner as in the first embodiment of FIG. 1. The data signal or output from the playback head 11 in the second embodiment is processed and coupled to the oscilloscope 102 through the amplifier 18 in the same manner as the first embodiment. A tape loop is used to provide the delay to the trigger signal in lieu of the electronic means described in the first embodiment of the invention. As shown on FIG. 3, the output of the first playback head 10 is fed to a record filter-amplifier 19. This is a conventional filter-amplifier and is used to suppress noise in the ECG signal while providing a uniform gain to all components in the ECG signal. The ECG signal is therefore amplified without distortion to a level suitable for re-recording. The amplified ECG signal is applied to a tape loop record head 20 to record the signal on a tape loop 21. The tape loop 21 is driven by a drive roller 22 and with the tape 21 pressed against the drive roller 22 by a pinch roller 104. The main tape 100 is driven by a drive roller 23 in association with a pinch roller 106. The outer diameter of the main tape drive roller 23 and the tape loop drive roller 22 is the same and the outer diameter of a pair of intermediate rollers 108 and 110 is also the same so that the tape loop speed will be identical to that of the main tape. The delay of the signal recorded on the tape loop 21 is achieved by positioning a trigger playback head 24 a predetermined distance downstream of the record head 20.

The ECG signal reproduced by the trigger playback head 24 is fed into an amplifier-filter 27 and then into a monostable multi-vibrator 28 which are substantially identical to the amplifier-filter 12 and monostable multi-vibrator 13 described with reference to the first embodiment of the invention. In the second embodiment of the invention, the output signal from the amplifier-filter 28 is applied directly to the sweep generator 17 at the proper time in relation to the arrival of the data signal from amplifier 18 so as to provide for the display of superimposed complete ECG complexes on the oscilloscope 102.

With the second embodiment of the invention, the separation distance between the tape loop record head 20 and the playback head 24 is slightly less than the separation distance between the first and second playback heads 10 and 11 on the main tape in order to provide the trigger signal at a point ahead of the data signal from the main tape to achieve a presentation of the complete ECG complex. It will be apparent that this same result may also be obtained with various combinations of drive speed ratios, tape drive outer diameters, and record and playback head separations while retaining the advantage of the proper delay irrespective of main tape playback speed.

The tape loop delay of the second embodiment is completed with the addition of a conventional tape erase circuit 33 and erase head 25 capable of erasing the previously recorded signal prior to the recording of subsequent ECG signals. In addition, an idler 26 is used to provide the proper tape loop tension.

Figure 4:
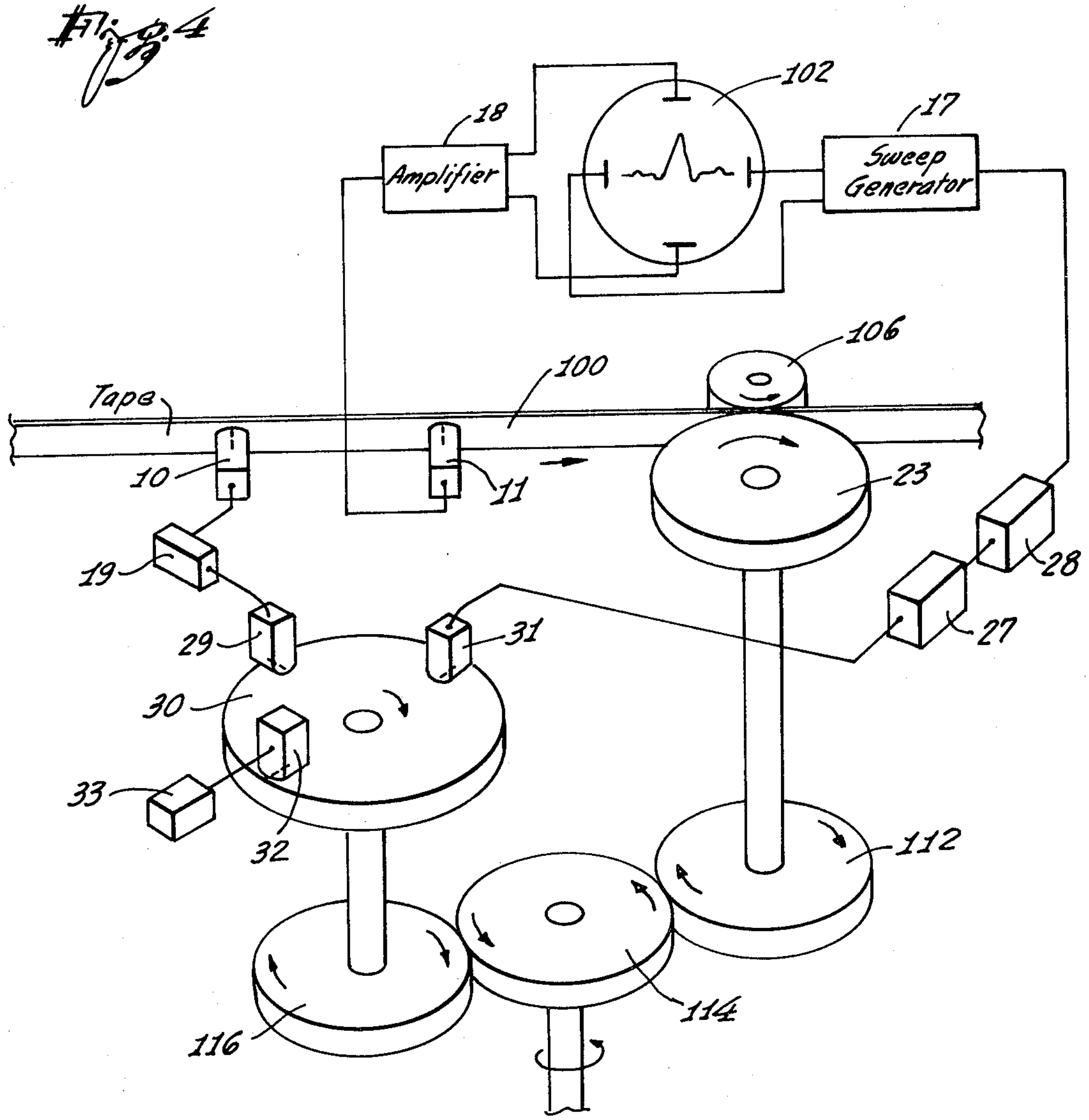
FIG. 4 is a schematic view of a third embodiment of the invention employing a disc means to provide the delay.

In the third embodiment of the invention shown in FIG. 4, the playback heads 10 and 11, the main tape 100, as well as the circuitry for the date signals to the oscilloscope 102 are substantially identical to those previously described in the first and second embodiments. In addition, the ECG signals from the first playback head 10 are passed through the filter-amplifier 19 in the same manner as in the second embodiment of the invention and with the resultant signal being introduced into a record and playback system. As shown in FIG. 4, this record and playback system comprises a record head 29, a magnetic disc 30 and disc drive, a playback head 31, and an erase circuit 33 and erase head 32. The record and playback system is designed so that the trigger signal output from the system has the desired time delay in comparison with the input signal to the system. This delay is accomplished by an input of the ECG signal from the filter-amplifier 19 into the record head 29, whereby the ECG signal is recorded on a magnetic disc 30. The trigger playback head 31 of the system is positioned so that it reproduces the ECG signal from the disc slightly before the corresponding data signal on the main tape 100 is reproduced by the playback head 11. As in the previous embodiments of the invention this adjustment of the delay is necessary for an oscilloscope presentation of the entire ECG complex.

In the system as shown on FIG. 4, the distance between the heads 29 and 31 is slightly less than the distance between the heads 10 and 11 since the ECG signal on the main tape 100 and on the magnetic disc 30 travels the same distance per unit of time by virtue of the circumferential track on the disc 30 and the circumference of the main tape drive roller 23 being equal and with both the disc 30 and roller 23 having the same rotational speed because they are interconnected by drive rollers 112, 114 and 116 all having the same diameter. The system of FIG. 4 maintains the proper delay regardless of the speed of the main tape 100. It is obvious that the results of the system of FIG. 4 may also be obtained with various com-binations of different distances between the heads 29 and 31, ratios of main tape drive roller diameters and disc tracks, and ratios of disc and main tape drive speeds.

The output from trigger playback head 31 is again processed through the filter-amplifier 27, through monostable multi-vibrator 28, and fed to the sweep generator 17 to control the sweep generator in the same manner as described with reference to the second embodiment of the invention. Also the record and playback system is completed by inclusion of an erase circuit 33 and erase head 32 to clear the disc track after it has passed playback head 31 and prior to record head 30.

The invention and its attendant advantages will be understood from the foregoing description and it will be apparent to those skilled in the art that various changes may be made without departing from the spirit and scope of this invention. The trigger time delay device is therefore not to be thought of as limited to the electronic and electromechanical methods set forth and the invention is only to be limited by the following claims.

I claim:

1. A system for reproducing recurring signals recorded on a magnetic medium and on a single track on the medium, including first and second means displaced in position along the medium a predetermined distance from each other for reproducing the recurring signals on the medium and with the first means providing for the reproduction before the second means, third means coupled to the first means for producing a trigger signal from the recurring signal reproduced by the first means and with the trigger signal including individual trigger pulses corresponding to a particular portion of each of the recurrent signals, fourth means coupled to the second means for providing a recurring display of the recurrent signal reproduced by the second means to provide a superimposed display of each of the recurrent signals on the preceding recurrent signal, fifth means coupled to the third means for delaying the trigger signal to compensate for the displacement of the position between the first and second means and the position of the particular portion of the recurrent signal used to provide the trigger signal relative to a position necessary to provide a full display of each recurrent signal, and sixth means coupled to the fourth and fifth means for controlling the sweep of the display of the recurrent signal in accordance with the delayed trigger signal.

2. The system of claim 1 wherein the recurrent signals are ECG signals and the trigger signals are formed from the R portion of the ECG complex.

3. The system of claim 1 wherein the fifth means includes a plurality of series of multivibrators the output of each controlling the suceeding multivibrator and with the plurality of multivibrators providing the delay.

4. The system of claim 1 wherein the fifth means includes a moving magnetic tape loop and with means for recording the trigger signal on the tape loop at a first position and repro-ducing the trigger signal from the tape loop at a second position displaced from the first position so as to provide the delay.

5. The system of claim 1 wherein the fifth means includes a moving magnetic disc and with means for recording the trigger signal on the disc at a first position and reproducing the trigger signal from the disc at a second position displaced from the first position so as to provide the delay.

6. A reproducing and display system for reproducing and displaying ECG signals recorded on a single track of a moving magnetic tape and with the ECG signals forming a recurring complex and including and R portion of increased amplitude relative to the other portions of the ECG complex, including first means coupled to the magnetic tape at a first position for reproducing the ECG signals, second means responsive to the ECG signals reproduced by the first means for displaying the ECG signals as reproduced by the first means, third means coupled to the second means for providing a recurring sweep of the ECG signals displayed by the second means, and fourth means coupled to the magnetic tape at a second position in advance of the first portion to reproduce at least the R portion of the ECG signals before the reproduction of the ECG signals by the first means and including means for producing a delayed trigger signal from the R portion of the ECG signal to control the recurring sweep provided by the third means to produce a superimposed display of each complete ECG complex relative to the preceding ECG complex.

7. The reproducing and display system of claim 6 wherein the delay provided by the means included in the fourth means compensates for the difference in position between the first and fourth means relative to the magnetic tape and the relative position between the R portion of the ECG complex and a point to provide a full display of the ECG complex.

8. The reproducing and display system of claim 6 wherein the delay provided by the means included in the fourth means is produced by a plurality of series multivibrators the output of each controlling the succeeding multivibrator.

9. The reproducing and display system of claim 6 wherein the delay provided by the means included in the fourth means is produced by a recording and reproducing system including a loop of magnetic tape.

10. The reproducing and display system of claim 6 wherein the delay provided by the means included in the fourth means is produced by a recording and reproducing system including a magnetic disc.

* * * * *

UNITED STATES PATENT OFFICE

CERTIFICATE OF CORRECTION

Patent No. 3,718,772 Dated February 27, 1973

Inventor(s) Clifford Sanctuary

It is certified that error appears in the above-identified patent and that said Letters Patent are hereby corrected as shown below:

The title of the patent should read as follows:

DYNAMIC ECG PRESENTATION

Signed and sealed this 18th day of December 1973.

(SEAL)
Attest:

EDWARD M. FLETCHER, JR.
Attesting Officer

RENE D. TEGTMEYER
Acting Commissioner of Patents